United States Patent [19]

Sakamoto et al.

[11] Patent Number: 5,116,631

[45] Date of Patent: May 26, 1992

[54] LOW-CALORIE FOOD PRODUCTS CONTAINING KONJAK MANNAN AND PROCESSES FOR PREPARING THE SAME

[75] Inventors: Jiro Sakamoto; Hiromi Tanuma, both of Kawasaki, Japan

[73] Assignee: Ajinomoto Company, Inc., Tokyo, Japan

[21] Appl. No.: 646,504

[22] Filed: Jan. 23, 1991

Related U.S. Application Data

[63] Continuation of Ser. No. 455,945, Dec. 22, 1989, abandoned.

[30] Foreign Application Priority Data

Dec. 26, 1988 [JP] Japan ................... 63-326276
Jul. 6, 1989 [JP] Japan ................... 1-174548

[51] Int. Cl.$^5$ ............................................. A23J 3/00
[52] U.S. Cl. ................................. 426/568; 426/564
[58] Field of Search ............... 426/564, 586, 605, 568

[56] References Cited

U.S. PATENT DOCUMENTS 3,300,318 1/1967 Szczesniak et al. ............... 426/605

4,582,714 4/1986 Ford et al. ........................ 426/605

FOREIGN PATENT DOCUMENTS 57-122748 7/1982 Japan .
59-17950 1/1984 Japan .

OTHER PUBLICATIONS

Dow Chemical Company, Designed Products Dept., 1981, "Selecting Methocel Food Gums to Improve Your Food Products", Dow Form #192-855-1281R, p. 3.

Matz, S. A., 1987, "Formulas and Processes for Bakers", Pan-Tech. Int'l, Inc., McAllen, Tex., pp. 132–133.

Pyler, E. J., 1952, "Baking Science and Technology", Siebel Publishing Co., Chicago, Ill., p. 348.

*Primary Examiner*—R. B. Penland
*Attorney, Agent, or Firm*—Oblon, Spivak, McClelland, Maier & Neustadt

[57] ABSTRACT

Low-calorie foods containing konjak mannan, such as meringues and mayonnaise-like foods, and processes for preparing such foods are disclosed.

4 Claims, No Drawings

LOW-CALORIE FOOD PRODUCTS CONTAINING KONJAK MANNAN AND PROCESSES FOR PREPARING THE SAME

This application is a continuation of application Ser. No. 07,455,945, filed on Dec. 22,1989, now abandoned.

BACKGROUND OF THE INVENTION

1. Field of the Invention

The present invention relates to low-calorie food products, such as meringues and mayonnaise-like foods, which contain konjak mannan and processes for preparing the same.

2. Discussion of the Background

Low-calorie versions of foods are becoming increasingly important as society becomes more aware of the relationship between diet and health. In particular, low-calorie versions of normally high-calorie foods, such as meringue and mayonnaise, are desirable.

Meringue, which is a material for foods such as sponge cakes, etc., utilizes the foaming properties of egg white, but in order to obtain good quality meringue, the use of sugar is regarded as essential. The reason is that by the addition of sugar to egg white, more minute and more stable foams are formed than the case of egg white alone.

However, in general, the amount of sugar added to the egg white solution is quite high, such as 50–100 g per 100 g of the egg white solution, and the resulting meringue and sponge cakes utilizing it are inevitably high in calories.

Therefore, various thickening stabilizers for the purpose of replacing the function of sugar in meringue have been studied, among which konjak mannan is known to have an effect to improve the qualities of meringue.

Konjak mannan is a hardly digestible polysaccharide obtained from the roots of konjak, a plant belonging to the taro family, and is believed to have physiological functions of a food fiber such as the prevention of constipation, lowering of the blood cholesterol etc., and konjak mannan aqueous solutions exhibit remarkable thickening properties like various polysaccharides. Therefore, there have been various studies of the use konjak mannan as a thickening stabilizer for various foods, and konjak mannan has been used for the prevention of the deformation of meringue or as a replacement for sugar (Japanese Patent Application Laid-open No. 28237/1983 and Japanese Patent Application Laid-open No. 17950/1984), and specifically, meringue is produced by adding and mixing a solution of konjak mannan at the time of whipping the egg white.

However, when konjak mannan is used in meringue by the above-described conventional methods, it has been found that the following serious drawbacks are encountered:

(1) The konjak mannan powder is poor in solubility, and therefore when meringue is produced by adding it to an egg white solution, most of the konjak mannan particles added cannot be dissolved and thus remain in the meringue as undissolved particles.

(2) When konjak mannan is dissolved in water beforehand and added to an egg white solution, it is possible to dissolve into the egg white solution under conditions where the concentration of the konjak mannan aqueous solution is 1% or less, but with the addition of about 10 g of the 1% konjak mannan aqueous solution based on 100 g of the egg white solution, a satisfactory effect to form and stabilize the merinque cannot be achieved. Further, if the amount of the konjak mannan aqueous solution added is increased, the egg solution itself is diluted with water as a result, and thus the resulting meringue and sponge cakes utilizing it are watery and have poor texture.

(3) In the case of a konjak mannan aqueous solution having a concentration of more than 1%, since it exhibits very high viscosity and has physical properties like a jelly, when added to an egg white solution, it forms lumps and cannot be dissolved.

Further, if dissolution operations such as stirring etc. are vigorously conducted, the egg white solution starts to foam and as a result, undissolved jelly-like konjak mannan remains in meringue, resulting in remarkable deterioration of the quality of the meringue and also the sponge cakes utilizing it.

Therefore, it is difficult to utilize konjak mannan and obtain good quality meringue by the prior art methods, and thus there remains a need for a process of preparing konjak mannan containing meringues efficiently which does not result in undissolved konjak mannan remaining in the merinque.

Mayonnaise, as is well known, is an O/W type emulsified product consisting of an oil phase and an aqueous phase, which has characteristic smooth texture as well as viscosity and thickness. In other words, in mayonnaise, oil is essential for forming the characteristic texture of mayonnaise. However, in general, the oil content in mayonnaise usually accounts for 70% by weight or so, and as a result, mayonnaise inevitably is very high in calories.

Therefore, applications of konjak mannan to mayonnaise have been previously studied. In Japanese Patent Application Laid-open No. 28237/1983, it is disclosed that the products are stabilized and concentrated by adding konjak mannan to mayonnaise. Further, in Japanese Patent Application Laid-open No. 122748/1982, a mayonnaise-like food in which the calorie content has been lowered by adding a konjak gel or sol is disclosed.

Further, the application of a gelatinized starch paste, which is a thermally gelatinized product of starch, for the purpose of aseptically producing a low acidity type mayonnaise is disclosed in Japanese Patent Publication No. 12706/1981.

However, a sol of konjak mannan exhibits remarkable thickening properties and viscoelasticity.

Therefore, in the production of mayonnaise, especially a mayonnaise-like food in which the oil content has been lowered, when konjak mannan is applied for the purpose of imparting the viscosity and thickness and, in addition, stabilizing the emulsion, a characteristic viscoelasticity is manifested in the product, thus only producing mayonnaise of very unfavorable qualities.

Further, when only the gelatinized starch paste is used, the emulsion of the product is partially broken and syneresis occurs, and the product feels powdery in the mouth, and thus it is impossible to obtain a mayonnaise of good qualities.

Thus, there remains a need for a mayonnaise-like food which does not differ from ordinary mayonnaise food in quality and a process for the production of a mayonnaise-like food which utilizes konjak mannan and in which the oil content has been lowered.

SUMMARY OF THE INVENTION

Accordingly, it is an object of the present invention to provide a low-calorie meringue which contains konjak mannan and does not suffer from the above-described drawbacks.

It is another object of the present invention to provide a process for preparing a low-calorie meringue which contains konjak mannan and does not suffer from the above-described drawbacks.

It is another object of the present invention to provide a low-calorie mayonnaise-like food which contains konjak mannan and does not suffer from the above-described drawbacks.

It is another object of the present invention to provide a process for preparing a low-calorie mayonnaise-like food which contains konjak mannan and does not suffer from the above-described drawbacks.

These and other objects which will become apparent during the course of the following detailed description have been achieved by the inventors' discovery that by preparing a homogenous konjak mannan aqueous solution having the predetermined concentration beforehand and thereafter mixing powdered egg white or powdered whole egg therewith, it is possible to produce good quality, homogeneous konjak mannan-containing meringues, and that by adding gelatinized starch paste in combination with konjak mannan to mayonnaise-like foods having a reduced oil content, the texture is remarkably improved.

Thus, one aspect of the present invention relates to a process for the production of meringue which is characterized by mixing powdered egg white or powdered whole egg with an aqueous solution containing at least konjak mannan as an ingredient and the meringues produced by this process.

Another respect of the present invention relates a low-calorie mayonnaise-like food which is characterized by containing konjak mannan and a gelatinized starch paste and a process for preparing such a mayonnaise-like food.

DETAILED DESCRIPTION OF THE PREFERRED EMBODIMENTS

The konjak mannan in the present invention may be either of the so-called konjak powder or purified konjak mannan, and as long as it exhibits a thickening effect so as to achieve the effect of the invention, its production processes, the diameter, the shape, etc. of the powder are not constrained.

Further, the powdered egg white may be in general that obtained by drying and pulverizing fresh egg white, but in the present invention, its production process, properties etc. are not particularly restricted as long as it has foaming properties sufficient to form meringue. Further, the use of egg yolk in addition to egg white, in other words, the case of powdered whole egg, is also within the present invention if it has sufficient foaming properties.

In the production of meringue in the present invention, it is necessary to prepare an aqueous solution of konjak mannan. Usually, for dissolving konjak mannan, after konjak mannan is dispersed in water, a swelling step for about 1-2 hours is included, but in the present invention, the process for the preparation of the solution is not particularly restricted. In short, it is enough that when the konjak mannan has been fully dissolved in water and has become homogeneous by the naked eye, it has sufficient viscosity.

Suitably, the concentration of konjak mannan is 0.05-2% by weight, preferably 0.1-1% by weight. With a concentration of less than 0.05% by weight, the viscosity of the aqueous solution is inadequate, and the ability to stabilize foams of meringue is not sufficiently manifested, whereas with a concentration of higher than 2% by weight, the viscosity is too high, and the mixing of the egg white powder (or whole egg powder) described hereinbelow becomes very difficult and the foaming properties are also lowered.

The aqueous solution of konjak mannan in the present invention means that it contains at least konjak mannan as an ingredient, and unless the effect of the present invention is inhibited, it is needless to say that the solution may also contain various sweetening agents, seasoning agents, table salt, sugars, various thickening agents, etc.

Next, the powdered egg white or powdered whole egg is mixed with the konjak mannan aqueous solution obtained by the above-described method and, according to need, foaming operations are conducted. The method for mixing the powdered egg white or the powdered whole egg and the method for foaming are not particularly restricted. By using a method which comprises gradually adding the powdered egg white or powdered whole egg while stirring the konjak mannan aqueous solution, the dissolving of the powdered egg white or powdered whole egg and the foaming may be simultaneously effected and this method is preferred from an operational point of view. Further, the stirring speed, the stirring time, the solution temperature, etc. in this case are not particularly restricted. In short, conditions where the powdered egg white or powdered whole egg is dissolved and foams sufficiently to form meringue suffice.

Although the amount of the powdered egg white and powdered whole egg added, based on the konjak mannan aqueous solution, depends on the foaming power of the powdered egg white or powdered whole egg, the viscosity of the konjak mannan aqueous solution, etc., in general, the powdered egg white is added in an amount of about 10-20 parts by weight or the powdered whole egg is added in an amount of about 15-30 parts by weight per 100 parts by weight of the konjak mannan aqueous solution. Of course, depending on the properties of the intended meringue, it is not necessary to be confined within this formulation ratio.

The thus-obtained konjak mannan-containing meringue may be used in processed foods such as sponge cakes, sherbets etc. as with ordinary meringue.

The low-calorie mayonnaise-like food which is an object of the present invention means a mayonnaise-like food in which the oil content is 50% by weight or less based on the final product. Conventionally, with this level of oil content, the viscosity and thickness of the product is lost, and also the stability of the emulsion is lowered due to a relative increase in the amount of the aqueous layer part. Therefore, in the present invention, in order to improve these properties konjak mannan is utilized.

The konjak mannan used in the production of a mayonnaise-like food in the present invention may be either of the so-called konjak powder or purified glucomannan, and as long as it exhibits a thickening effect sufficient as to manifest the effect of the invention, its production process, particle diameter, shape, degree of purification etc. are not constrained.

The amount of konjak mannan added to the mayonnaise-like food is, although depending on the quality of the konjak mannan, in the range of 0.05-0.5% by weight, preferably 0.1-0.3% by weight, based on the product weight. According to the discovery of the present inventors, when the amount added is less than 0.05% by weight, the stability of the emulsion is poor and the texture is also watery. Further, when 0.5% by weight is exceeded, the product becomes too high in viscosity and lacks smoothness.

There is no restriction on the method of adding or the time of adding the konjak mannan, but when using konjak mannan which has poor solubility, it is preferred to swell the konjak mannan with an appropriate amount of water before adding. Further, as regards the time of adding, emulsification is easier if the konjak mannan is added before the addition of oil, that is, before the emulsification step.

Next, the gelatinized starch paste used in the present invention is described. The gelatinized starch paste in the present invention means that obtained by heating to gelatinize starch or a starch-based starting material in the presence of water. The starch used may be corn, wheat, rice, tapioka, etc., but in the present invention, the kind of starch is not particularly restricted. Further, the method of preparing the paste, for example, the amount of water added on gelatinization or the gelatinization temperature or pH is not particularly restricted. What is important is that conditions under which the starch can be fully gelatinized are used. Furthermore, it is also possible to add the above described konjak mannan at the time of preparation of gelatinized starch paste and to use a complex compound of konjak mannan and gelatinized starch.

The amount of the gelatinized starch paste added is in the range of 1-10% by weight, preferably 3-7% by weight, based on the end product. That is, according to the discovery by the present inventors, when the amount added is less than 1%, the intended effect to improve texture is not adequate, and when it exceeds 10%, the powderiness characteristic of the gelatinized starch paste is manifested in the product, giving a mayonnaise-like food of very unfavorable qualities. Further, in regard to the time of addition, it is preferred to add the gelatinized starch paste before the addition of oil, as with konjak mannan.

In the present invention, as described above, conditions other than the oil content and the addition of konjak mannan and the gelatinized starch, that is, the kinds or amounts of the oil and other starting materials added, or the production process such as sterilization, emulsification etc., further, the distributing form and method of the finished products, etc. are free from any restriction. That is, konjak mannan, the gelatinized starch paste, vinegar, egg yolk or whole eggs, various seasonings, an emulsifier such as a gum-like material as well as an edible oil are formulated according to need, and emulsification and homogenization are conducted in the conventional manner to form an O/W type emulsion, thereby obtaining a low-calorie mayonnaise-type food.

The thus-obtained low-calorie mayonnaise-like food may be widely applied for seasoning, etc. of various foods including salad, like ordinary mayonnaise.

Having generally described this invention, a further understanding can be obtained by reference to certain specific examples which are provided herein for purposes of illustration only and are not intended to be limiting unless otherwise specified.

EXAMPLES

COMPARATIVE EXAMPLES OF MERINGUE

According to the formulations of Table 1, each meringue was prepared. The production process was such that sugar or a konjak mannan powder or a konjak mannan solution was gradually added to an egg white solution while stirring, and after the whole amount had been charged, stirred at a low speed (scale 1) for 1–2 minutes and further stirred at a high speed (scale 2) for 5 minutes by using a hand mixer (Model HM-310 manufactured by Toshiba Co., Ltd.) to obtain the meringue. The foaming properties and the stability of the foams were measured on the obtained meringue, and further, according to the formulations of Table 2, sponge cakes were prepared by using each meringue given in Table 1, and an organoleptic evaluation was conducted. The baking conditions were 10 minutes in an oven at 170° C.

The results are set forth in Table 3. Thus, in each test section, it was impossible to obtain meringue or sponge cakes having sufficient quality.

TABLE 1

Formulation Table of Meringue Starting Materials

| Test Section | Egg White Solution (g) | Sugar (g) | Konjak Mannan Powder (g) | Konjak Mannan Soln Concentration (%) | Konjak Mannan Soln Amount Added (g) |
|---|---|---|---|---|---|
| Control | 100 | 70 | — | — | — |
| A-1 | 100 | — | 1 | — | — |
| A-2 | 100 | — | 2 | — | — |
| B-1 | 100 | — | — | 1 | 10 |
| B-2 | 100 | — | — | 1 | 30 |
| B-3 | 100 | — | — | 2 | 10 |
| B-4 | 100 | — | — | 2 | 20 |

TABLE 2

Formulation Table of Sponge Cake Starting Material

| Starting Material | Amount Added (g) |
|---|---|
| Meringue | 120 |
| Flour | 50 |
| Milk | 15 |
| Butter | 15 |
| Egg yolk | 38 |
| Total | 238 g |

TABLE 3

Results of Evaluation

| | Foaming Properties[*-1] | Foam Stability[*-2] | Results of Organoleptic Evaluation of Sponge Cakes |
|---|---|---|---|
| Control | 72% | 91% | Good |
| A-1 | 73 | 92 | Particles of konjak mannan touch the teeth crunchily |
| A-2 | 71 | 92 | Particles of konjak mannan touch the teeth crunchily |
| B-1 | 82 | 60 | Lacks the rising and firmness |
| B-2 | 81 | 69 | Watery and sticky texture |
| B-3 | 81 | 90 | Jelly-like konjak mannan touches the teeth |
| B-4 | 79 | 91 | Jelly-like konjak mannan |

TABLE 3-continued

Results of Evaluation

| | Foaming Properties(*-1) | Foam Stability(*-2) | Results of Organoleptic Evaluation of Sponge Cakes |
|---|---|---|---|
| | | | touches the teeth |

$$(*\text{-}1)\text{Foaming Properties} = 1 - \frac{\text{Weight of 100 cm}^3 \text{ of Sample after Foaming}}{\text{Weight of 100 cm}^3 \text{ of Sample before Foaming}} \times 100\ (\%)$$

$$(*\text{-}2)\text{Stability} = 1 - \frac{\text{Weight of Liquid Dissolved out of 100 cm}^3 \text{ of Meringue after Left at Room Temperature for an Hour}}{\text{Weight of 100 ml of Meringue Immediately after Foaming}} \times 100\ (\%)$$

EXAMPLE 1

3 g of konjak mannan was added to 1000 ml of tap water, then stirred at a low speed (scale 1) for 5 minutes by using a hand mixer (Model HM-310 manufactured by Toshiba Co., Ltd.) and thereafter allowed to stand at room temperature for an hour to obtain a viscous konjak mannan aqueous solution. Then, while stirring this konjak mannan aqueous solution at a low speed by the above-described hand mixer, 150 g of powdered egg white ("Egg White Powder W" produced by Taiyo Chemical K.K.) was gradually charged thereto, and after the whole amount had been charged, stirred at a high speed (scale 2) for 5 minutes to obtain a foam, thereby obtaining a konjak mannan-containing meringue. The obtained meringue was subjected to the measurements of the foaming properties and the foam stability and also to the organoleptic evaluation by the methods described in the Comparative Examples. As the ordinary product, the control described in Table 1 was used.

The results are set forth in Table 4. Thus, the meringue according to the present invention was very good from the point of physical properties and also organoleptically, almost comparable to the ordinary product.

TABLE 4

| | Results of Meringue Evaluation | | |
|---|---|---|---|
| | Foaming Properties | Foam Stability | Results of Organoleptic Evaluation |
| Ordinary Product | 72% | 91% | Good |
| Product of the Present Invention | 77% | 94% | Good, and undissolved konjak mannan is not detected |

EXAMPLE 2

Using the ordinary product and the product of the present invention obtained in Example 1, sponge cakes were experimentally prepared. The process for this experimental production was conducted as in the Comparative Examples, and for comparison, that using meringue containing only the egg white was also experimentally produced as a blank. The results of the organoleptic evaluation conducted on the obtained sponge cakes are shown in Table 5. Thus, the sponge cakes using the konjak mannan-containing meringue obtained by the present invention were of a very good quality.

TABLE 5

| Results of Organoleptic Evaluation of Sponge Cakes | |
|---|---|
| | Results of Evaluation |
| Blank | Very hard texture. Most foams are collapsed. |
| Control | Soft, full and good texture. Minute foams. |
| Product of the Present Invention | Soft, full and good texture. Minute foams. |

As described above, the present invention enables one to easily obtain meringue of an extremely good quality as compared with the prior art. By using the konjak mannan-containing meringue, there may be obtained not only meringue-containing processed foods having a low sugar content, such as sponge cakes etc. but also, by the use of a highly sweet sweetening agent in combination, low-calorie meringue-containing processed food comparable to ordinary products from an organoleptic aspect and also a viewpoint of physical properties.

COMPARATIVE EXAMPLES OF MAYONNAISE LIKE-FOOD

According to the formulations of Table 6, mayonnaise-like foods were experimentally produced.

Corn starch was used after suspending in the predetermined amount of water and heating to gelantinize at 90°-95° C. for 15 minutes. Alternatively, konjak mannan was dissolved in the predetermined amount of water, allowed to swell at room temperature for an hour and then added.

The emulsifying method was such that those other than oil were mixed beforehand, and oil was gradually added while vigorously stirring by a cooking cutter (MK-132 produced by National K.K.) and, after the addition, stirred for another 5 minutes to make a product.

Organoleptic evaluations were conducted by trained panelists using the control as the standard. The results are set forth in Table 7. Thus, by the addition of the konjak mannan or the gelatinized starch paste alone, it was impossible to obtain a good quality mayonnaise-like food.

TABLE 6

| | Formulation Table of Starting Materials | | | | |
|---|---|---|---|---|---|
| Starting Material | Control | Blank | A | B | Remarks |
| Edible oil | 73.4% | 32.3% | 32.3% | 32.3% | "Corn Salad Oil" produced by Ajinomoto K.K. |
| Whole egg | 12.0 | 12.0 | 12.0 | 12.0 | |
| Vinegar | 9.0 | 9.0 | 9.0 | 9.0 | "Mitsukan Grain Vinegar" produced by Nakano Sumise K.K. |
| Sugar | 3.0 | 3.0 | 3.0 | 3.0 | |
| Table salt | 1.8 | 1.8 | 1.8 | 1.8 | |

TABLE 6-continued

Formulation Table of Starting Materials

| Starting Material | Control | Blank | A | B | Remarks |
|---|---|---|---|---|---|
| Mustard paste | 0.8 | 0.8 | 0.8 | 0.8 | 2.5 Times of water added |
| Water | — | 41.1 | — | — | |
| Konjak mannan | — | — | 0.4 | — | |
| Water | — | — | 40.7 | — | |
| Corn starch | — | — | — | 7.8 | "Corn Starch (W)" produced by Nippon Shokuhin Kako K.K. |
| Water | — | — | — | 33.3 | |
| Total | 100% | 100% | 100% | 100% | |

TABLE 7

Results of Organoleptic Evaluation

| Item | Blank | A | B |
|---|---|---|---|
| Appearance | Separation of the aqueous layer is recognized | Slightly while | Syneresis is observed Slightly white |
| Mouthfeel | Very watery Lacks body feeling | Viscoelasticity is felt in the mouth | Slightly powdery |
| Taste, Flavor | Acid taste is strongly felt | Comparable to the Control | Starch smell detected |
| Total Evalution Point* | 1.1 | 3.0 | 2.5 |

(*Average value of the evaluation points of the respective samples when evaluated into 10 ranks taking the control as 5, 1: very poor, 10: very delicious)

EXAMPLE 3

According to the formulation in Table 8, a mayonnaise-like food was experimentarily produced. The method for testing was according to the method of described above in the Comparative Examples.

The results of organoleptic evaluation conducted by 20 trained panelists using the control as the standard are set forth in Table 9. Thus, the mayonnaise-like food by the present invention was of a quality as good as ordinary products.

TABLE 8

Formulation Table of Starting Materials

| Starting Material | Control | Product of the Invention | Remarks |
|---|---|---|---|
| Edible oil | 73.4% | 32.3% | "Corn Salad Oil" produced by Ajinomoto K.K. |
| Whole egg | 12.0 | 12.0 | |
| Vinegar | 9.0 | 9.0 | "Mitsukan Grain Vinegar" produced by Nakano Sumise K.K. |
| Sugar | 3.0 | 3.0 | |
| Table salt | 1.8 | 1.8 | |
| Mustard paste | 0.8 | 0.8 | 2.5 Times of water added |
| Konjak mannan | — | 0.3 | |
| Water | — | 11.6 | |
| Corn starch | — | 5.7 | "Corn starch (W)" produced by Nippon Shokuhin Kako K.K. |
| Water | — | 23.5 | |
| Total | 100% | 100% | |

TABLE 9

Results of Organoleptic Evaluation

| Total Evaluation point | Number (out of 20) |
|---|---|
| Much more delicious than the Control | 1 |
| Slightly more delicious than the Control | 5 |
| Comparable to the Control | 11 |
| Slightly inferior to the Control | 3 |
| Much inferior to the Control | 0 |

EXAMPLE 4

According to Table 10, a mayonnaise-like food was produced. First, konjak mannan was dissolved in the predetermined amount of water and allowed to swell at 5° C. for 2 hours to prepare a konjak mannan sol. Thereafter, flour was added and mixed with this sol and heated at 95° C. for 30 minutes, and then cooled in running water to prepare a konjak mannan - gelatinized starch complex paste. The starting materials other than the edible oil were mixed into this complex paste, and then while gradually adding the edible oil, emulsification was effected by a homogenizer to obtain a low-calorie mayonnaise-like food.

This product was subjected to tasting evaluation by experts and determined that it is of a very good quality comparable to ordinary products.

TABLE 10

Formulation Table of Starting Materials

| Starting Material | Formulation Ratio | Remarks |
|---|---|---|
| Edible oil | 40.0 | "Salad Oil" produced by Ajinomoto K.K. |
| Egg yolk | 7.0 | |
| Vinegar | 10.0 | "Mitsukan Grain Vinegar" produced by Nakano Sumuse K.K. |
| Table salt | 1.8 | |
| Mustard paste | 1.0 | 2.5 Times of water added |
| Konjak mannan | 0.15 | |
| Flour | 4.35 | Low-gluten flour produced by Nisshin Seifun K.K. |
| Water | 31.70 | |
| Total | 100.0 | |

EXAMPLE 5

According to the formulation of Table 11, a mayonnaise-like food was experimentarily produced.

First, konjak mannan and xanthane gum were dissolved in the predetermined amount of water, allowed to swell at room temperature for 2 hours, and heated at 80° C. for an hour to obtain a complex gel. Further, the starch was suspended in the predetermined amount of water, and then heated at 80° C. for 20 minutes to obtain a gelatinized starch paste.

Thereafter, to this gelatinized starch paste was added the above-described complex gel dissolved by heating at 60° C. and further the starting materials other than the edible oil were added and mixed.

Further, the edible oil was gradually added to this mixture, and emulsification was conducted with a mixer to obtain a low-calorie mayonnaise-like food.

This product was subjected to tasting evaluation by experts and determined that it is of a very good quality comparable to or superior to ordinary products.

TABLE 11

Formulation Table of Starting Materials

| Starting Material | Formulation Ratio | Remarks |
|---|---|---|
| Edible oil | 28.0 | "Corn Salad Oil" produced by Ajinomoto K.K. |
| Whole egg | 13.0 | |
| Vinegar | 11.0 | "Mitsukan Grain Vinegar" produced by Nakano Sumise K.K. |
| Sugar | 3.0 | |
| Table salt | 2.0 | |
| Mustard paste | 0.8 | 2.5 Times of water added |
| Starch | 6.0 | "Ginrei" produced by Ajinomoto K.K. |
| Water | 22.0 | |
| Konjak mannan | 0.12 | |
| Xanthane gum | 0.04 | "Ecoh Gum" produced by Dainippon Seiyaku K.K. |
| Water | 14.04 | |
| Total | 100.00 | |

As described above, by the present invention, it has become possible to provide a low-calorie mayonnaise-like food in which the quality has been extremely improved as compared with the prior art.

The low-calorie mayonnaise-like food utilizing konjak mannan according to the present invention is not only low in calories but also is expected to have various beneficial physiological functions of konjak mannan as a food fiber and is quite rich in taste, which suits the healthy orientation of the modern consumer.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A process for preparing meringue, consisting essentially of mixing an aqueous solution of 0.05-2% by weight konjak mannan with an amount of powdered egg white and/or powdered whole egg effective to produce homogeneous konjak mannan containing meringue.

2. The process of claim 1, wherein said aqueous solution contains konjak mannan in an amount of 0.1-1% by weight.

3. The process of claim 1, wherein said powdered egg white is present in an amount of about 10-20 parts by weight per 100 parts weight of said aqueous solution.

4. The process of claim 1, wherein said powdered whole egg is present in an amount of about 15-30 parts by weight per 100 parts by weight of said aqueous solution.

* * * * *